United States Patent [19]

Kinoshita et al.

[11] Patent Number: 4,685,064
[45] Date of Patent: Aug. 4, 1987

[54] ELECTRIC DISCHARGE MACHINING CONDITION SETTING SYSTEM

[75] Inventors: Mitsuo Kinoshita, Hachiouji; Haruki Obara, Sagamihara, both of Japan

[73] Assignee: Fanuc Ltd, Japan

[21] Appl. No.: 618,397

[22] PCT Filed: Oct. 12, 1983

[86] PCT No.: PCT/JP83/00339

§ 371 Date: May 25, 1984

§ 102(e) Date: May 25, 1984

[87] PCT Pub. No.: WO84/01734

PCT Pub. Date: May 10, 1984

[30] Foreign Application Priority Data

Oct. 25, 1982 [JP] Japan ................... 57-185975

[51] Int. Cl.4 ............... G05B 19/405; B23Q 15/00
[52] U.S. Cl. ................. 364/474; 364/189; 340/709
[58] Field of Search ........... 364/188, 189, 191, 192, 364/171, 146, 474, 475; 340/709–712, 720, 722; 219/69 G, 69 M

[56] References Cited

U.S. PATENT DOCUMENTS

| | | | |
|---|---|---|---|
| 4,189,765 | 2/1980 | Kotalik et al. | 364/154 |
| 4,280,182 | 7/1981 | Mickowski | 364/167 |
| 4,303,973 | 12/1981 | Williamson | 340/722 |
| 4,365,300 | 12/1982 | Johanson | 219/69 M |
| 4,366,360 | 12/1982 | Inoue | 219/69 M |
| 4,413,314 | 11/1983 | Slater et al. | 364/138 |
| 4,451,895 | 5/1984 | Sliwkowski | 340/707 |
| 4,479,197 | 10/1984 | Haag et al. | 364/900 |
| 4,490,781 | 12/1984 | Kishi et al. | 364/171 |
| 4,521,843 | 6/1985 | Pezzolo | 364/145 |
| 4,521,860 | 6/1985 | Kanematsu | 364/171 |
| 4,533,990 | 8/1985 | Takada | 364/146 |
| 4,542,452 | 9/1985 | Fukai | 364/146 |

FOREIGN PATENT DOCUMENTS 0076328 4/1983 European Pat. Off. ........... 364/189

OTHER PUBLICATIONS

560 Process Controller, Barber-Colman, 8/1/1980.

Primary Examiner—Jerry Smith
Assistant Examiner—Allen MacDonald
Attorney, Agent, or Firm—Staas & Halsey

[57] ABSTRACT

A wire cut electric discharge machining condition setting system including cursor shift push button switches for selecting with a cursor one of the machining conditions displayed on a screen at a CRT display unit, numerical push button switches for setting values of the selected machining conditions, and increment and decrement push button switches for continuously updating the preset values of the machining conditions all arranged in a wire cut electric discharge machine. The value of the machining condition selected with the cursor is set by the numerical push button switches and is updated by the increment and decrement push button switches.

2 Claims, 3 Drawing Figures

ELECTRIC DISCHARGE MACHINING CONDITION SETTING SYSTEM

BACKGROUND OF THE INVENTION

The present invention relates to a machining condition setting system in a wire cut electric discharge machine having a numerical control unit.

In conventional wire cut electric discharge machines, a predetermined voltage is applied to a gap formed between a workpiece and a wire electrode extending along the longitudinal direction of the machine in order to cut the workpiece by a small amount each time. At the same time, the wire electrode is moved relative to the workpiece in accordance with instruction data so as to produce a workpiece with a predetermined shape. An electric discharge machine of this type requires specific machining conditions such as a voltage applied to the gap, a peak value and an average value of a current which flows through the gap, a capacitance of a discharge circuit, a duty cycle of a pulse applied to the gap, a tension force acting on the wire electrode, and a resistivity of a working fluid supplied to the gap, depending on the material and thickness of the workpiece and a diameter of the wire electrode. An operator who operates the wire cut electric discharge machine must preset these machining conditions at an operation panel on the numerical control unit by considering the material and thickness of the workpiece and the diameter of the wire electrode.

However, in the conventional wire cut electric discharge machine, the machining conditions are preset by a rotary switch. For this reason, rotary switches must be provided for the respective machining conditions. When the preset values of the machining conditions are updated, it is difficult to gradually update these preset values. In addition to this disadvantage, when the preset values of the machining conditions change greatly during machining, hunting occurs and the wire electrode is undesirably cut. As a result, scratches are formed on the workpiece.

SUMMARY OF THE INVENTION

It is a first object of the present invention to display various machining conditions on a CRT display unit so as to allow values of these machining conditions to be set with numerical push buttons.

It is a second object of the present invention to provide an electric discharge machining condition setting system capable of continuously updating the preset data.

It is a third object of the present invention to provide an electric discharge machining condition setting system capable of changing a data updating rate in accordance with a degree of updating when the various machining conditions are continuously updated.

In order to achieve the above objects of the present invention, various machining conditions are displayed on a screen at a CRT display unit in a wire cut electric discharge machine to allow an operator to select proper machining conditions with a cursor and preset values with machining condition push buttons. In addition to this arrangement, there are also provided increment and decrement push buttons in addition to numerical push buttons "0" to "9" to allow continuous increase/decrease of the preset values by depressing the increment-/decrement push button for a given time.

According to the present invention, by changing the depression time of the increment/decrement push button, a data updating rate can be changed.

As described above, in a wire cut electric discharge machining setting system, the machining conditions can be easily preset and updated with numerical push buttons. In addition to this advantage, the preset values can be continuously changed by using the increment and decrement push buttons. As a result, hunting and wire disconnections will not occur even if the preset values are greatly changed, unlike in conventional updating using rotary switches.

When the preset values are gradually updated, the updating rate can be changed by changing the depression time of the increment/decrement push button, thereby accurately updating the preset data at a high speed.

DETAILED DESCRIPTION OF THE PREFERRED EMBODIMENT

The present invention will be described in detail with reference to the accompanying drawings.

Figure 1:
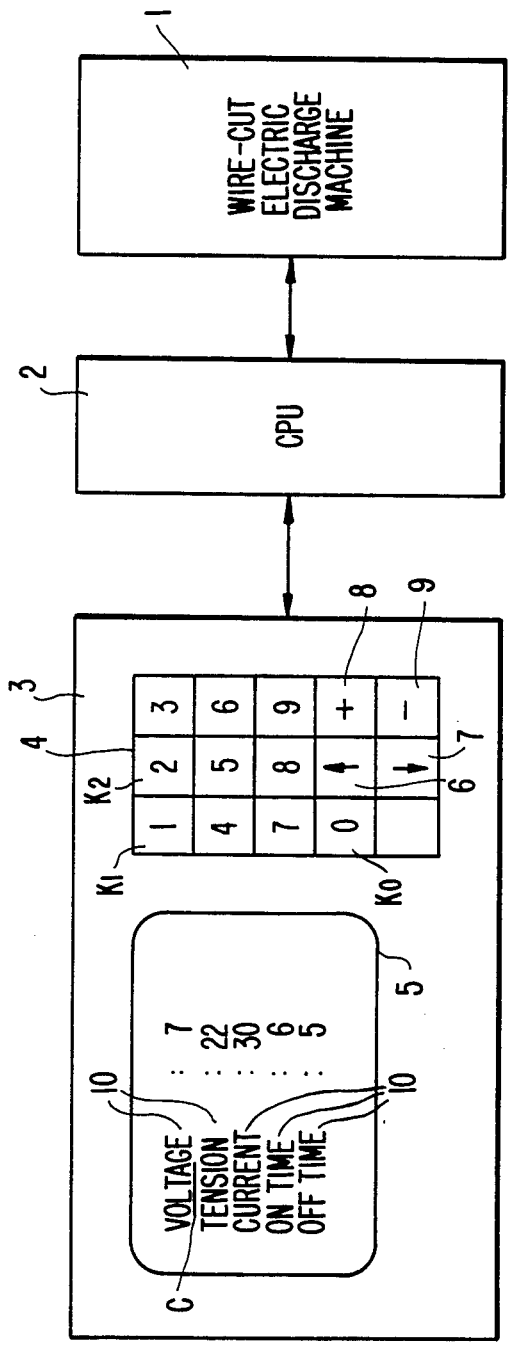
FIG. 1 is a block diagram of an embodiment of the present invention.

FIG. 1 is a block diagram of an embodiment of the present invention. Referring to FIG. 1, reference numeral 1 denotes a wire cut electric discharge machine; reference numeral 2 denotes a CPU; reference numeral 3 denotes an operation panel; and reference numeral 4 denotes push button switches. The push button switches 4 comprise numerical push button switches K0 to K9 which respectively correspond to "0" to "9" keys, cursor shift button switches 6 and 7 for shifting a cursor C appearing on a screen at a CRT display unit 5, an increment push button switch 8 for increasing a preset value, and a decrement push button switch 9 for decreasing the preset value.

When various machining conditions 10 are preset and updated, the operator selectively depresses the cursor shift button switches 6 and 7 to vertically shift the cursor C so as to select a desired one of the machining conditions 10. The operator selectively depresses the numerical push button switches K0 to K9 to enter a desired value. For example, as shown in FIG. 1, machining condition "VOLTAGE" is selected with the cursor C, and numerical push button switches K1 and K5 are depressed to enter numerical data "15". In this manner, the machining conditions 10 can be easily preset with the push button switches.

However, when the preset values are updated during machining, hunting and wire disconnection occur. In particular, the current abruptly increases and the wire electrode tends to be disconnected. In order to prevent these drawbacks, according to the present invention, the increment and decrement push buttons 8 and 9 are arranged to continuously and gradually update the preset values. In particular, when the increment (+) push button switch 8 is continuously depressed, the value of the selected machining condition is incremented one by one. Similarly, when the decrement (−) push button switch 9 is continuously depressed, the value of the selected machining condition is decremented one by one. In this manner, the preset value can be continuously changed.

Figure 2:
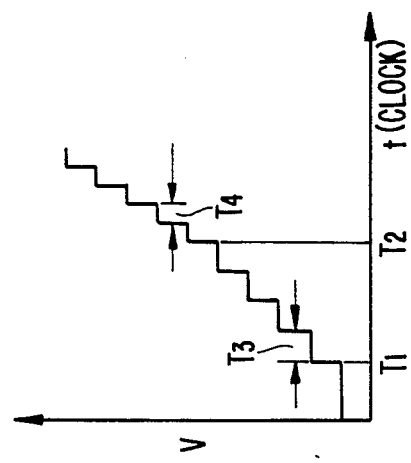
FIG. 2 is a graph illustrating the operation of the FIG. 1 embodiment.
Figure 3:
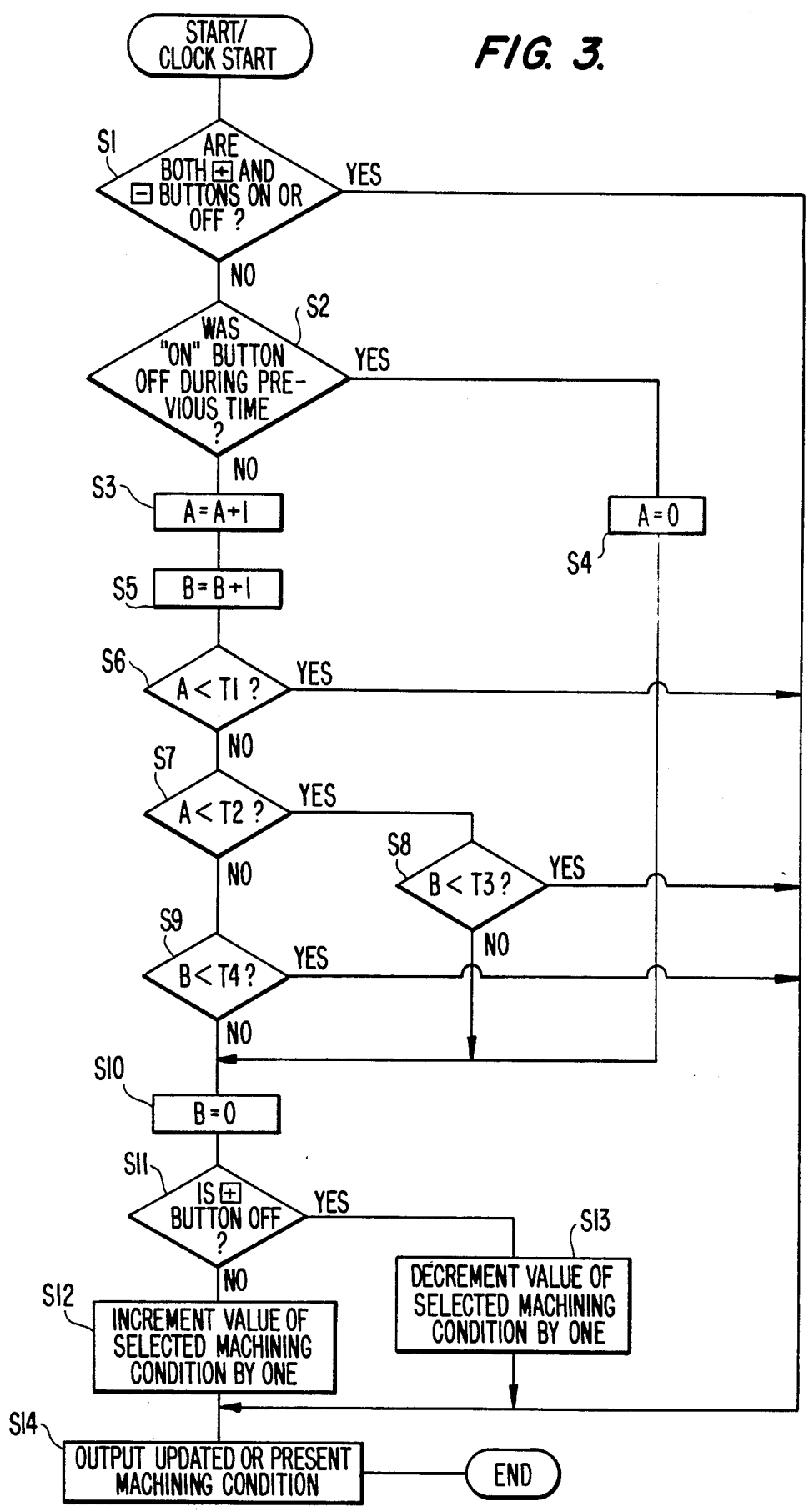
FIG. 3 is a flow chart illustrating the operation of the FIG. 1 embodiment.

The effect of gradual updating of the preset data will be described with reference to FIGS. 2 and 3. Referring to FIG. 2, a depression time t of the increment/decrement push button switch 8 or 9 is plotted alng the abscissa, and a change V in preset value of each machining condition 10 is plotted along the ordinate. It should be noted that FIG. 2 shows the case wherein the increment push button switch 8 is depressed to increase the value of a machining condition 10. When the operator continuously depresses the increment push button switch 8 within a first predetermined time T1 (e.g., one second), the value of the selected machining condition is incremented by one, as shown in FIG. 2. However, when the operator continuously depresses the increment push button switch 8 for longer than the first predetermined time T1, the value of the selected machining condition is incremented one by one for each of a third predetermined time T3 (e.g., 0.5 second). In addition, if the operator continues to depress the increment push button switch 8 for more than a second predetermined time T2 (e.g., three seconds), the value of the selected machining condition is incremented by one for each of a fourth predetermined time T4 (i.e., 0.3 second) which is shorter than the third predetermined time T3. FIG. 2 shows the case wherein the increment push button switch 8 is continuously depressed, as previously mentioned. However, when the decrement push button switch 9 is continuously depressed, the value is decreased in the same manner as that described with reference to the increment push button switch 8. Thus, the data updating rate is changed in accordance with the depression time of the increment/decrement push button switch 8 or 9, thereby enabling a desired value to be quickly selected.

The operation for increasing the preset value will be described with reference to the flow chart shown in FIG. 3. The CPU 2 checks in step S1 if both the increment and decrement push button switches 8 and 9 are ON or OFF. If in step S1 they are, then the present machining condition is produced and displayed on the screen at the CRT display unit 5 in step S14. Subsequently, the operator selectively depresses the cursor shift button switches 6 and 7 to shift the cursor C to the position of a desired machining condition whose data is to be updated. When the operator then depresses the increment push button switch 8, the CPU 2 detects in step S1 that either the increment button switch 8 or the decrement button 9 (increment button switch in the case as shown in FIG. 2) is depressed. The CPU 2 then checks in step S2 whether or not the "ON" button (increment button) was ON during the previous clock time. Since this button was not turned on in the previous clock time, counters A and B in the CPU 2 are cleared such that A=0 and B=0 in steps S4 and S10. Since the depressed button is the increment push button switch 8 (step S11), the value of the machining condition indicated by the cursor C is increased by one in step S12. The updated machining condition is produced and displayed at the CRT display unit in step S14. When the next clock signal is entered, the increment push button switch 8 is set in the ON state (step S1). In particular, since the increment push button switch 8 was turned on during the previous clock signal and is still ON (step S2), the counters A and B are respectively incremented by one in steps S3 and S5. In step S6 the count of the counter A is compared with the first predetermined time T1 to determine if the count is smaller than the value of the first predetermined time T1. If it is, then steps S1, S2, S3, S5 and S6 are repeated for every clock pulse so as to increment the counters A and B. More specifically, as shown in FIG. 2, the incremented value is maintained until the first predetermined time T1 has elapsed. When it is determined in step S6 that the count of the counter A exceeds the first predetermined time T1, then the count of the counter A is compared with the second predetermined time T2 in step S7 to determine if the count is smaller than the second predetermined time T2. If if is, then the count of the counter B is compared with the third predetermined time T3 in step S8 to determine if the count is smaller than the time T3. Initially, the count of the counter B is larger than the value of the third predetermined time T3, so that the counter B is cleared in step S10. The value of the selected machining condition is incremented by one in step S12 and the incremented value is displayed in step S14. During the subsequent clock times, steps S1, S2, S3, S5, S6, S7 and S8 are repeated until the count of the counter B exceeds the third predetermined time T3. When the count of the counter B becomes equal to or larger than the value of the third predetermined time T3 (i.e., if NO condition exists in step S8), the counter B is cleared in step S10. The value of the selected machining condition is incremented by one in step S12. The updated value is displayed in step S14. In the same manner as described above, the operation is repeated until the count of the counter A exceeds the value of the second predetermined time T2. As shown in FIG. 2, the value of the selected machining condition is incremented one by one for each interval corresponding the third predetermined time T3, during interval between the first predetermined time T1 and the second predetermined time T2. When it is determined in step S7 that the count of the counter A exceeds the value of the second predetermined time T2, the count of the counter B is compared with a fourth predetermined time T4 in step S9 to determine if the counter is smaller than the value of the fourth predetermined time T4. If it is, then the value of the machining condition is not updated. However, if is not, then the counter B is set to be zero in step S10, and the value of the machining condition is incremented by one. Thereafter, every time the count of the counter B exceeds the value of the fourth predetermined time T4, the value of the machining condition is incremented by one. In this case, the fourth predetermined time T4 is set to be shorter than the third predetermined time T3 and the updating rate is increased. In other words, when the depression time is elongated, the updating rate is increased.

The operator depresses the decrement push button switch 9 to decrease the value of the machining condition in the same manner as described with reference to the operation of the increment push button switch 8.

In the above embodiment, a two-step updating rate is adopted to change the values of the machining conditions. However, three- or four-step updating rates can be used in place of the two-step updating rate.

We claim:

1. A wire cut electric discharge machining condition setting system comprising:
 a display unit;
 cursor shift push button switch means for shifting a cursor on the display unit and for selecting, via said cursor, a machining condition to be changed;

numerical push button switch means for receiving manual inputs and for changing the selected machining condition in accordance with said manual inputs;

increment and decrement push button switch means including an increment button and a decrement button, for updating a preset value of said selected machining condition, including means for determining whether or not the increment button is depressed and for determining whether or not the decrement button is depressed;

means for increasing the preset value by a predetermined amount in accordance with the increment button being depressed;

means for decreasing the preset value by a predetermined amount in accordance with the decrement button being depressed;

means for changing the rate at which said selected machining condition is changed in accordance with a depression time of said increment and decrement push button switch means and such that the preset value is changed so that neither hunting nor undesirable cutting of the wire electrode occurs when the preset value is updated during machining, including means for detecting the time that said increment and decrement push button switch means is depressed;

means for determining if the detected time falls in a first time period of a second time period larger than the first time period; and renewal means for selectively operating said increment and decrement push button switch means for a first time interval when the detected time falls within the first time period, for operating said increment and decrement push button switch means for a second interval when the detected time falls within the second time period and for operating said increment and decrement push button switch means during a first time period so as to prevent abrupt changes in the preset value during a time from just after said increment and decrement push button switch means is depressed to the time at which said first time period begins.

2. A wire cut electric discharge machining condition setting system comprising:

display means having a display screen with a cursor, for displaying a plurality of machining conditions and associated values; and input means for controlling the position of the cursor on the display screen, for selecting, in accordance with the position of the cursor, a machining condition having one of an associated value to be changed and a preset value, and for inputting data corresponding to an amount of change in the associated value of the selected machining condition such that the associated value is continuously changed by a predetermined amount for first intervals during a first time period and by a predetermined amount for second intervals being less than the first intervals, during a second time period and such that the preset value is changed so that neither hunting nor undesirable cutting of the wire electrode occurs when the preset value is updated during machining.

* * * * *